Aug. 13, 1968          B. HUTTON          3,396,613
              JIG FOR USE WITH A MACHINE TOOL
Filed Feb. 25, 1966                     2 Sheets-Sheet 1
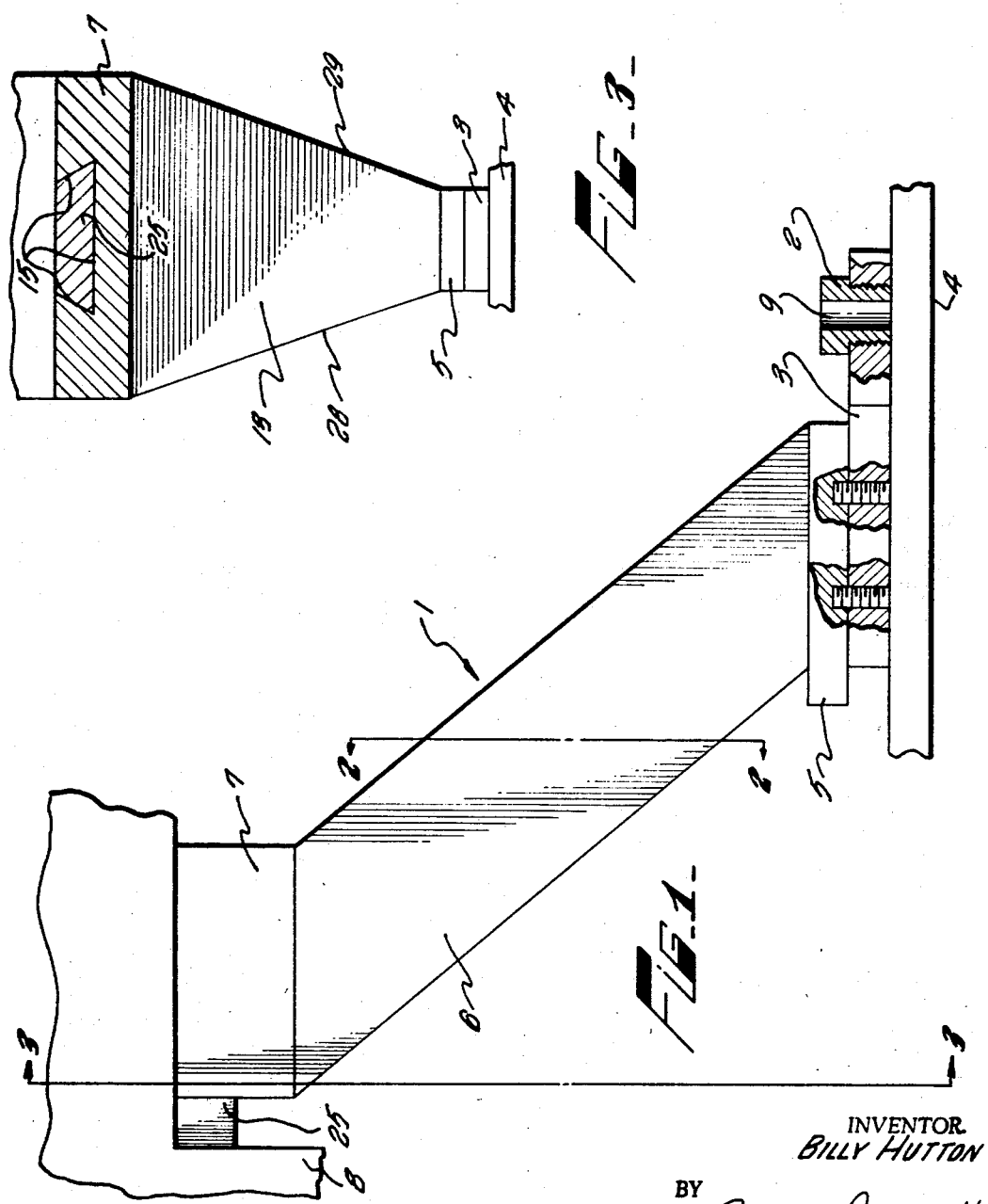
INVENTOR.
BILLY HUTTON
BY
Christie, Parker & Hale
ATTORNEYS

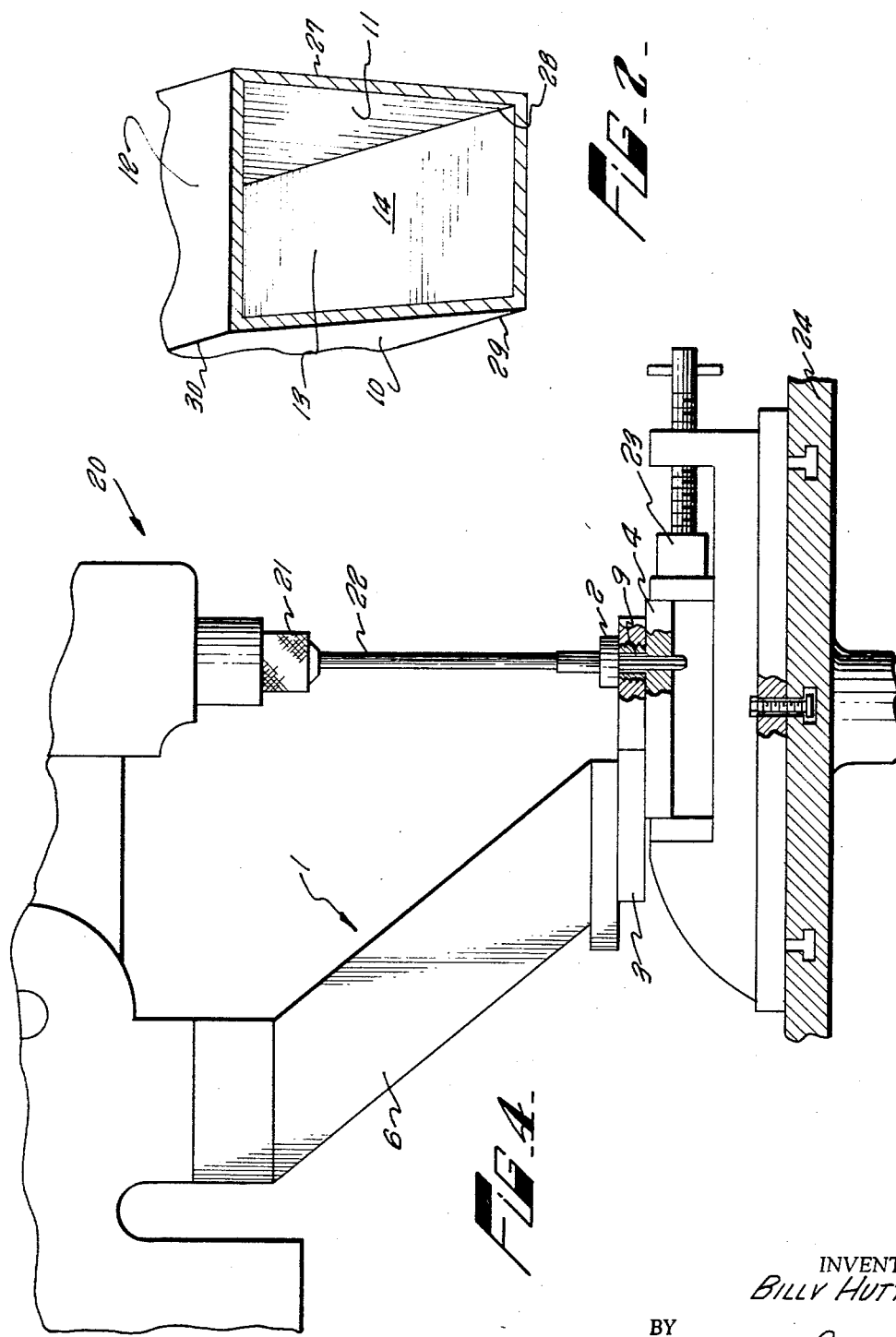

United States Patent Office 3,396,613
Patented Aug. 13, 1968

3,396,613
JIG FOR USE WITH A MACHINE TOOL
Billy Hutton, 1594 Paloma, Pasadena, Calif. 91104
Filed Feb. 25, 1966, Ser. No. 529,996
1 Claim. (Cl. 77—55)

ABSTRACT OF THE DISCLOSURE

The jig has a first and a second end rigidly connected through a tapered beam. The beam converges from the first end to the second end. The first end has a mortise for attaching the jig to the tenon of a machine tool such that the second end depends downwardly and outwardly from the first end. The second end has a demountable flange in which is mounted a drill bushing for guiding the cutting tool of the machine tool.

---

This invention relates to a precision jig for the fabrication of holes in a workpiece by a machine tool utilizing a cutting tool which rotates about its longitudinal axis.

In the fabrication of holes in a workpiece severe dimensional tolerances are often required. These tolerances may be in the order of 0.0005 of an inch or better. When such holes are produced through the use of a machine tool, the prior art has generally resorted to either of two alternatives to support or guide the cutting tool. Guidance is necessary to produce the required dimensional tolerances and is occasioned by such factors as: the misalignment of drills and reamers; surface irregularities in the workpiece; and, the angle of the workpiece in relation to the cutting tool. These and other conditions have a tendency to produce a hole which is oversize and outside acceptable dimensional limits.

One method heretofore employed to overcome these and associated problems utilizes as cutting tools a center drill, an undersize drill, and a boring bar. The center drill is secured in the spindle of a machine tool and a centering hole is drilled. Because of the rigidity of the center drill, its hole serves to properly locate the axis of the finished hole in the workpiece. After the center drill is used, an undersize drill is placed in the spindle of the machine and a hole is drilled using the centering hole as a guide. After the latter hole is drilled, it is brought to its final dimensions through the use of a boring bar carried by a boring head which in turn is secured in the spindle. However, this finishing step occasions considerable difficulty because of the nature of the boring bar. These bars have a single cutting bit disposed along a lower lateral edge of the bar. Often the cutting bit digs into the surface of the hole and forces the bar off center to produce an irregularly shaped or oversize hole which in many instances destroys the workpiece.

A second alternative heretofore employed by the prior art, when a large volume of similar workpieces is required, utilizes a drill fixture or jig. The jig is fabricated to hold the workpiece and to allow for the ingress of a cutting tool or tools for the fabrication of the desired holes. After the workpiece is positioned within the jig, the jig is positioned relative to the cutting tool and the hole in the workpiece is drilled and reamed out to its final size. To guide the drill and reamer, drill bushings are used. These bushings are commercially available in many sizes and are characteristically two types: slip fit drill bushings and press fit drill bushings. The slip fit drill bushing is designed to be slipped into a hole in the jig and secured in place by a lock screw mounted on the jig. Because of the requirement for reaming, the drill bushings originally used are undersized to properly guide the undersize drill. After the drilling operation, a second and larger drill bushing is used to guide the reamer in the finishing of the hole.

Briefly, this invention provides a new and novel jig for use with a machine tool of a class utilizing a cutting tool which rotates about its longitudinal axis above a table or platform in position to bear on and fabricate a hole in a workpiece. The jig is in the form of a rigid structure having one end adapted to be fixedly and demountably attached to a stationary portion of the machine tool. The other or second end of the jig is adapted to be disposed substantially normal to the axis of rotation of the cutting tool, proximate to the table, and above the workpiece. This end has an aperture which, when the jig is mounted on the machine tool, is aligned with the axis of rotation of the cutting tool in position for the cutting tool to pass through, bear on, and fabricate a hole in the workpiece. The aperture is adapted to securely receive a drill bushing which guides the cutting tool.

In preferred form, the present invention comprises a jig with the vertical axis of each of its ends being parallel but spaced apart. Integral with the ends is a midsection which depends downwardly and away from the first end to the second end. The mid-section of the jig includes geometrically similar upper and lower trapezoidal plates disposed in generally a parallel relation. These plates are connected and spaced apart through the use of two webs. Each of the webs is attached to a corresponding non-parallel edge of each of the plates and each is generally normal to the plates. The second or converging end of the jig is a demountably attached flange or flat plate through which there is an aperture. The aperture is designed to accommodate a drill bushing which in turn guides a cutting tool as it fabricates a hole in a workpiece located below the flange. The first end of the jig has a trapezoidal cavity in the form of a mortise. The mortise is sized to fit a standard size ram which is found on many machine tools in the form of a tenon.

Among the advantages inherent with the jig of this invention is the time required to perform a precision drilling operation. When mounted on a machine tool, such as a mill or a drill press, an operator need merely drill a hole in a workpiece with an undersized drill which is guided by a drill bushing mounted in the aperture of the flange. The hole is finished by inserting a second drill bushing in the aperture and reaming the hole using the bushing to guide the reamer. Prior art methods, on the other hand, require as much as ten times as long to perform a given precision drilling operation. When using a drilling jig, considerable time was required to fabricate the device and properly mount the workpiece. Similarly, when using a boring bar, time was wasted for the latter method requires: (1) fixing the workpiece in a clamp; (2) securing a center drill in the machine tool and center-drilling the workpiece; (3) removing the center drill; (4) inserting an undersize drill in the machine tool and drilling a hole; (5) removing the drill; (6) inserting a boring head in the machine tool as well as a boring bar in the boring head; and (7) finishing the hole out to the required size. In addition, the jig of this invention, by eliminating the boring bar, eliminates the possibility of over-boring with its concomitant loss of time and expense in either correcting such a fault or in refabricating a new workpiece. Moreover, in utilizing the jig of this invention, no loss in the accuracy of holes fabricated is encountered because the aforementioned problems associated with the drill and reamer are overcome by guiding these tools with a drill bushing placed in the aperture of the flange of the jig.

These and other aspects, advantages and features of this invention will become more apparent from the following description, appended claim, and drawings in which:

FIGURE 1 is a side elevational view, partly in section, of the preferred embodiment of this invention;

FIGURE 2 is a view, partly in section, taken along line 2—2 of FIGURE 1;

FIGURE 3 is a view, partly in section, taken along line 3—3 of FIGURE 1; and

FIGURE 4 depicts the preferred embodiment of this invention, partly in section, illustrated in FIGURE 1 as it would appear in relaiton to a workpiece and a standard milling machine.

Referring now to FIGURE 1, the inventive jig is denoted generally by reference numeral 1. The first end of the jig 1 is demountably and fixedly secured to a stationary portion 8 of a machine tool, preferably on ram 25, as shown. The second end 5 of the jig 1 preferably comprises a plate or flange 3, demountably secured to the jig as shown. However, this flange or plate may be integral with the jig. In either case, an aperture, shown by reference numeral 9 through the plate 3 is provided for receiving a drill bushing 2, through which a cutting tool is guided. The cutting tool will bear on and fabricate a hole in the workpiece 4. In order for the cutting tool, through its guide (drill bushing 2), to fabricate precision holes within the workpiece 4, the entire jig 1 should be extremely rigid which in turn requires that midsection 6 be rigid.

The midsection 6 may be fabricated from many available preformed shapes such as a steel I-beam or H-beam. However, in its preferred form, this invention contemplates an extremely rigid jig which converges from the point of mounting on the machine tool to its second end. The converging characteristic yields a very rigid jig while at the same time providing a minimum of interference in the work area. Moreover, such a configuration allows for the securing of the fixture to rams which are often associated with machine tools. This configuration is more clearly shown in FIGURE 3. The first end 7 has a trapezoidal opening bounded by the lines 15 which form a mortise for receiving the ram 25 which is in the form of a pintle. The pintle 25 and mortise 15 form a dovetail joint as illustrated. The upper plate 12 and the lower plate 13 of the midsection 6, shown in FIGURES 2 and 3, are geometrically similar and generally trapezoidal in shape. These plates are spaced apart and secured to each other through the use of webs 10 and 11 which are connected to the non-parallel edges 27, 28, 29 and 30 of the plates. The rigid midsection thus formed by the webs 10 and 11 and plates 12 and 13 forms a cavity 14 and depends downwardly from the first end 7 when the jig is secured to a stationary portion of a machine tool 8 on the pintle or ram 25.

In operation, and with reference to FIGURE 4, the fixture 1 is found secured to a typical machine tool 20. Secured in spindle 21 is cutting tool 22, here shown as a reamer. The workpiece 4 is secured in a typical shop clamp 23 which is bolted to the table 24 as shown. In the flange 3 is secured a drill bushing 2 through which the reamer 22 passes and is guided as it finishes a hole in the workpiece 4.

When a precision hole is desired in the workpiece 4, the workpiece held by the clamp 23 is located on the table 24 in proper relation to the cutting tool 22. The jig will perform most satisfactorily when the workpiece 4 is as close as possible to the plate 3. A drill is secured in spindle 21 and sized to leave sufficient material for the finishing reaming operation. This selection is based on such factors as the size of the workpiece, the finish desired, and the material of the workpiece. An appropriate drill bushing 2 is inserted in aperture 9 and a hole is drilled. After the drill is removed from the spindle, the proper reamer 22 and its corresponding drill bushing are secured in their respective positions. The remaining step is then performed to finish the hole.

While the foregoing description was generally limited to the preferred embodiment of the inventive jig and its use with a standard milling machine, the concepts embodied in this invention are equally adaptable to many machine tools which are capable of fabricating holes in a workpiece through the use of a cutting tool which rotates about its longitudinal axis, for example, a drill press. Accordingly, it should be understood that the appended claim is not necessarily limited to the embodiments described.

What is claimed is:

1. For use with a machine tool of the type wherein a cutting tool rotates about its longitudinal axis and above a table, the cutting tool being capable of bearing on and fabricating a hole in the workpiece attached to the table, the machine tool having a tenon as a stationary portion thereof, a jig comprising:

(a) a rigid structure having a first end and a second end connected by a rigid tapered beam depending downwardly and outwardly of the first end, the tapered beam being defined by:
  (i) an upper trapezoidal plate,
  (ii) a lower trapezoidal plate at least substantially parallel to said upper trapezoidal plate and spaced apart therefrom such that the corresponding non-parallel edges of the plates are in a plane at least substantially normal to such plates,
  (iii) a first web connecting one of the nonparallel edges of one of the plates with the corresponding nonparallel edge of the other of the plates, and
  (iv) a second web connecting the other of the nonparallel edges of one of the plates with the corresponding other nonparallel edge of the other of the plates;

(b) the first end of the rigid structure being at the diverging end of the beam and having a mortise adapted to fit the tenon to form a dovetailed joint which fixedly and demountably attaches the tapered beam to the machine tool;

(c) the second end of the rigid structure comprising a flange having an aperture therethrough, the flange being demountably secured to the converging end of the tapered beam such that when the jig is mounted on the machine tool:
  (i) the flange is substantially normal to the axis of rotation of the cutting tool and proximate to the workpiece, and
  (ii) the aperture has its longitudinal axis disposed in at least substantial alignment with the axis of rotation of the cutting tool such that the cutting tool is capable of entering the aperture to bear on and fabricate a hole in the workpiece; and (d) a drill bushing removably mounted in the aperture in the flange for guiding the cutting tool in relation to the workpiece.

References Cited

UNITED STATES PATENTS

| | | | |
|---|---|---|---|
| 694,784 | 3/1902 | Ramsay | 77—5 |
| 804,919 | 11/1905 | Barnes | 77—5 |

FOREIGN PATENTS 77,953   10/1918   Switzerland.

FRANCIS S. HUSAR, *Primary Examiner.*